United States Patent
Daigle

(10) Patent No.: US 9,500,300 B2
(45) Date of Patent: Nov. 22, 2016

(54) METHOD FOR REPLACING A PACKING CHAMBER IN AN EXISTING VALVE

(71) Applicant: Marathon Petroleum Company LP, Findlay, OH (US)

(72) Inventor: Billy Ray Daigle, Dayton, TX (US)

(73) Assignee: Maraton Petroleum Company LP, Findlay, OH (US)

(*) Notice: Subject to any disclaimer, the term of this patent is extended or adjusted under 35 U.S.C. 154(b) by 0 days.

(21) Appl. No.: 14/614,503

(22) Filed: Feb. 5, 2015

(65) Prior Publication Data
US 2015/0226350 A1    Aug. 13, 2015

Related U.S. Application Data

(60) Provisional application No. 61/939,384, filed on Feb. 13, 2014.

(51) Int. Cl.
*F16K 41/02* (2006.01)
*F16J 15/20* (2006.01)

(52) U.S. Cl.
CPC ............ *F16K 41/026* (2013.01); *F16J 15/20* (2013.01); *Y10T 137/0486* (2015.04); *Y10T 137/0491* (2015.04)

(58) Field of Classification Search
CPC ....... F16K 41/026; F16K 41/02; F16J 15/18; F16J 15/20; Y10T 137/0486; Y10T 137/0491
USPC ............... 251/214; 277/510, 512, 514, 520, 277/318–319; 137/15.17, 15.18
See application file for complete search history.

(56) References Cited

U.S. PATENT DOCUMENTS

| | | | | |
|---|---|---|---|---|
| 1,572,922 A * | 2/1926 | Govers | ............... | F16K 41/02 251/214 |
| 2,691,773 A * | 10/1954 | Lichtenberger | ......... | F16K 37/00 137/312 |
| 2,731,282 A * | 1/1956 | McManus | ............... | F16J 15/46 277/513 |
| 3,199,876 A * | 8/1965 | Magos | ............... | F16J 15/181 251/355 |
| 3,307,574 A * | 3/1967 | Anderson | ............... | E21B 43/01 137/312 |
| 4,340,204 A * | 7/1982 | Herd | ............... | F16K 3/36 251/214 |
| 4,916,938 A * | 4/1990 | Aikin | ............... | G01M 3/2876 277/320 |
| 5,056,758 A * | 10/1991 | Bramblet | ............... | F16J 15/182 251/214 |
| 5,178,363 A * | 1/1993 | Icenhower | ............ | F16K 5/0285 137/246.22 |
| 5,230,498 A * | 7/1993 | Wood | ............... | F16J 15/186 137/553 |
| 5,372,352 A * | 12/1994 | Smith | ............... | F16J 15/004 137/240 |
| 5,908,046 A * | 6/1999 | Mosman | ............... | F16K 41/02 137/312 |
| 6,446,729 B1 | 9/2002 | Bixenman et al. | | |
| 7,571,765 B2 | 8/2009 | Themig | | |

(Continued)

*Primary Examiner* — John Bastianelli
(74) *Attorney, Agent, or Firm* — Emch, Schaffer, Schaub & Porcello Co., L.P.A.

(57) ABSTRACT

This packing chamber is for use within a valve for existing pipelines. The packing chamber can be easily incorporated into existing valves already in use. In the preferred embodiment, the packing chamber is seated between the body of a valve and the yoke tube. The invention creates a primary seal and a secondary seal that acts as a stopper should the first seal fail to ensure fluid is not accidently released to the environment.

1 Claim, 3 Drawing Sheets

(56) References Cited

U.S. PATENT DOCUMENTS

| | | |
|---|---|---|
| 7,669,653 B2 | 3/2010 | Craster et al. |
| 8,037,938 B2 | 10/2011 | Jardim De Azevedo et al. |
| 8,127,845 B2 | 3/2012 | Assal |
| 8,397,803 B2 | 3/2013 | Crabb et al. |
| 8,397,820 B2 | 3/2013 | Fehr et al. |
| 2010/0243235 A1 | 9/2010 | Caldwell et al. |
| 2011/0186307 A1 | 8/2011 | Derby |
| 2011/0247835 A1 | 10/2011 | Crabb |
| 2012/0012342 A1 | 1/2012 | Wilkin et al. |

* cited by examiner

METHOD FOR REPLACING A PACKING CHAMBER IN AN EXISTING VALVE

CROSS REFERENCE TO RELATED APPLICATION

The present applications claims the benefit of U.S. provisional patent application No. 61/939,384 filed Feb. 13, 2014.

BACKGROUND OF THE INVENTION

Oil, along with many other fluid products, is often moved through pipes from origin to destination. Valves are used in the pipeline to control the flow of fluid. Valves, long known in the art, are generally comprised of: a body or outer casing; a disk which is a movable obstruction inside the body that adjustably restricts the flow through the valve; a stem attached to the disk to control the placement of the disk and flow of product; a handle or wheel to turn the stem and open and close the valve; a bonnet to hold the parts within the body; ports to allow passage of fluid through the valve; a seat which is an interior surface of the body which contacts the disk to form a seal and prevent fluid from passing through the valve; packing which is used to prevent the leak of fluid from the valves; and a gland which exerts pressure on the packing to hold the packing in place and prevent fluid leakage around the stem. The handle rotates the stem which moves the disk into and out of engagement with the seat. When the disk is completely engaged with the seat, the movement of fluid through the valve is fully restricted. As the disk is disengaged from the seat, fluid passes through the valve. The further the disk is disengaged the more fluid passes through the valve.

The stem of the valve is commonly covered by a yoke tube which may or may not include packing. Packing is used to prevent fluid from traveling up the stem and exiting the valve. Current state of the art valves employ a single packing chamber, often located in the yoke tube, to assist in sealing the stem and preventing fluid leaks. If the packing fails, nothing remains to prevent fluid from traveling up the stem and entering the environment.

Thus, there exists a need for a better packing system which will reduce the risk of environmental exposure of the fluid.

There is a further need for a cost effective packing system that can be added to existing valves in existing pipelines without incurring the exhorbitant and needless cost of replacing the entire valve.

SUMMARY OF THE INVENTION

The invention includes, among other things, a packing chamber which can be easily incorporated into existing valves already in use. In the preferred embodiment, the packing chamber is constructed of metal or another durable material that may be seated between the body of a valve and the yoke tube. The packing chamber when inserted between the valve body and yoke creates a primary seal for the valve. The secondary packing chamber located in the yoke then acts as a secondary seal should the primary packing chamber fail to ensure fluid is not accidently released to the environment.

The two independent valve stem packing sets cooperatively operate to seal the pressurized section of a valve from the atmosphere. The dual packing assembly provides for primary and secondary sealing of the stem surface. If the primary seal fails, the fluid will leak into an open chamber between the primary and secondary seals. The fluid will be prevented from exiting the valve to the environment by the secondary seal. The invention allows for the easy removal and replacement of the packing chamber should it fail to operate as the primary seal.

The dual packing assembly of the present invention includes a monitoring system for use in detecting leaks at the primary packing chamber. Upon failure of the primary packing chamber the secondary packing chamber will restrain the flow of fluid from exiting through the stem. The fluid will flow through a thermal release to a pressure transmitter and ultimately back into the valve. The pressure transmitter, upon reaching a predetermined pressure, will send a signal to a receiver indicating that the primary packing chamber has been compromised. The fluid will flow from the pressure transmitter to a check valve which is set to a desired pressure. When the pressure is reached in the check valve, the check valve trips and allows the fluid to flow back into the valve/pipline thus reducing the pressure on the secondary packing chamber.

The present invention presents a desirable improvement over the existing prior art valve structures. The existing art utilizes a single packing set. Failure of the single packing set will result in a loss of fluid and contaminant to the atmosphere, resulting in a potential for environmental damage. The present invention provides an independent packing chamber that can easily be installed between the valve body and yoke of an existing operative valve.

Other objects and advantages of the present invention will become apparent to those skilled in the art upon a review of the following detailed description of the preferred embodiments and the accompanying drawings.

IN THE DRAWINGS

DETAILED DESCRIPTION OF THE INVENTION

Figure 1:
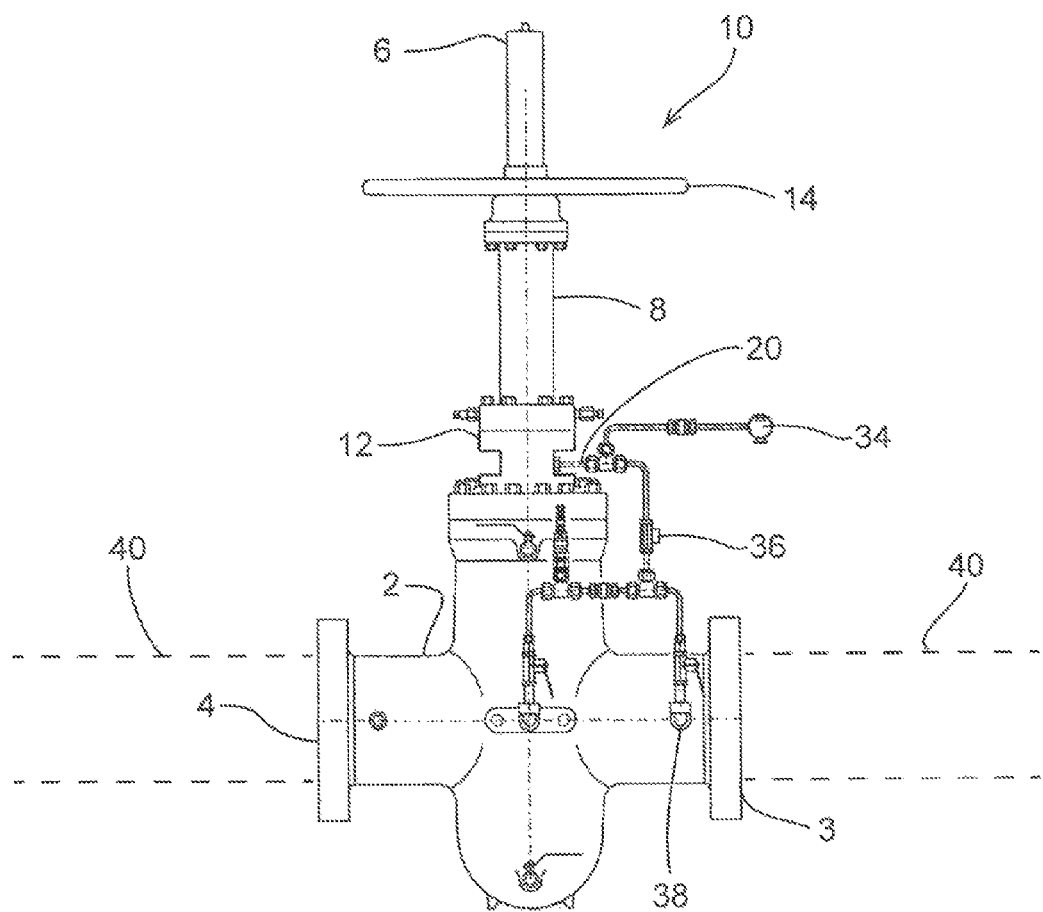
FIG. 1 is a schematic view of the proposed invention attached to a valve unit operatively located in an existing pipe line 40.

Referring now to FIG. 1 an existing valve 10 is shown with a packing chamber 12 in place. The existing valve 10 comprises a body 2, ports 3 and 4, a stem 6, a yoke tube 8, and a handle 14. When valve 10 is opened, fluid flows into port 3 through valve 10 and exits through port 4. The valve is opened and closed with the handle 14 which raises and lowers the stem 6. The stem 6 is attached to a disk (not shown) which engages a seat (not shown) to close the valve 10.

Figure 2:
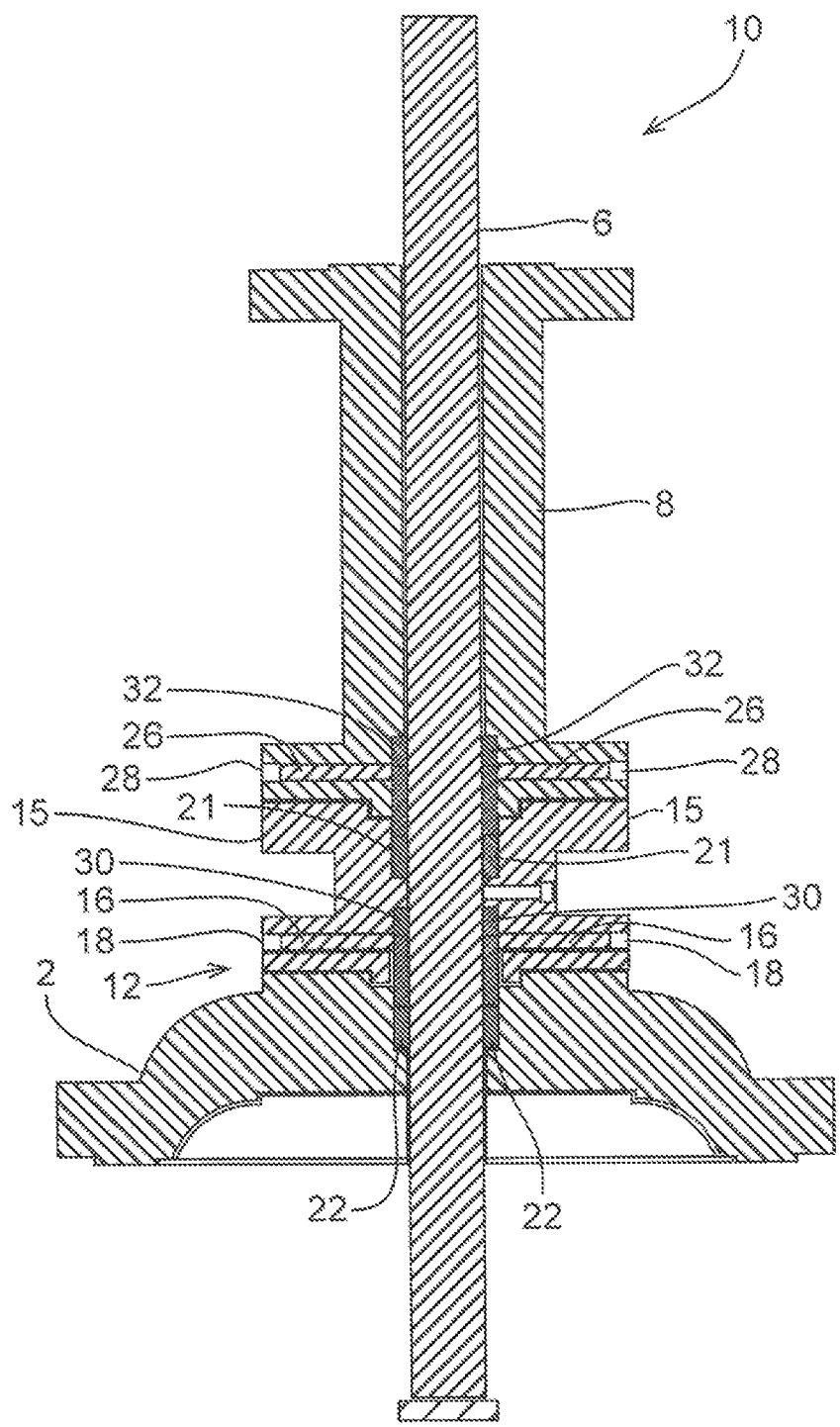
FIG. 2 is a cross section of FIG. 1.
Figure 3:
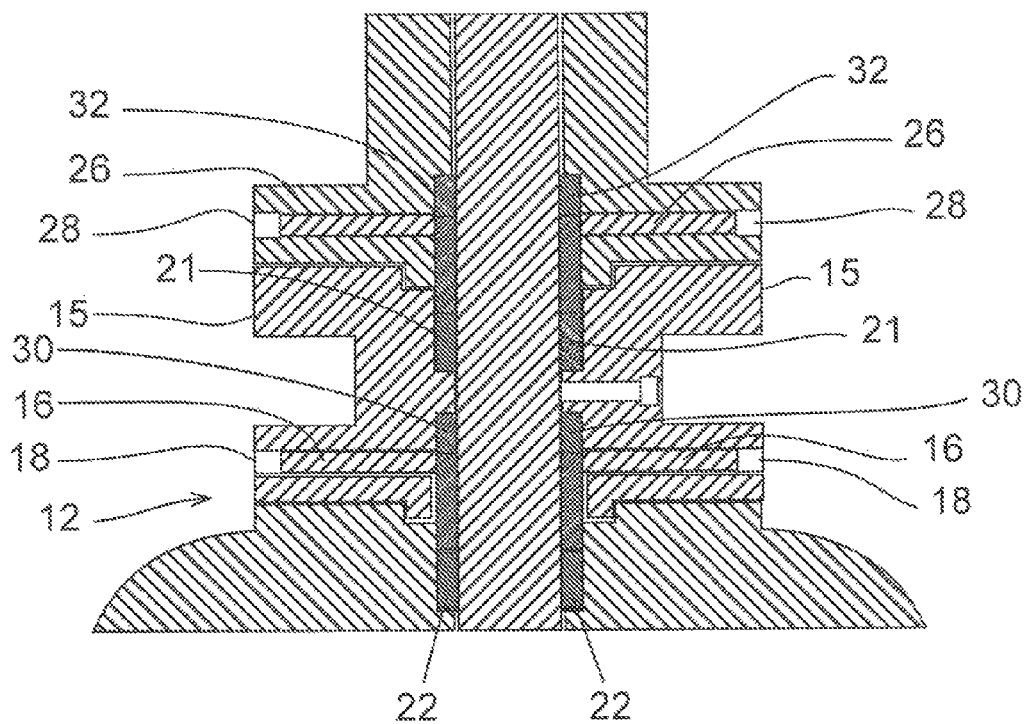
FIG. 3 is a partial cross section of FIG. 1.

Referring now to FIGS. 1 - 3, the packing chamber 12 can be seen in greater detail. The packing chamber 12 is added to the valve 10 by removing the yoke tube 8 and seating the chamber 12 over the stem 6. In the preferred embodiment, the chamber 12 is bolted to the valve body 2 and to the yoke tube 8. However, any suitable method of attachment may be used. The packing chamber 12 consists of: a body 15 made of metal or other suitable material, a thermal release 20, primary packing chambers 16, packing inlets 18, and chevron chambers 21, 22 and 30. The existing yoke tube 8 includes secondary packing chambers 26, packing inlets 28 and chevon chambers 32.

The thermal release 20 may be attached to a pressure transmitter 34 and/or a check valve 36. The pressure transmitter 34 is capable of detecting a change in pressure upon failure of the primary packing chamber 16 and transmitting a failure alert to an operation center. The check valve 36 is set to a desired pressure, when the desired pressure is reached the check valve opens and allows fluid to flow from the thermal release back into the valve body 2 at port 38.

In the event of a packing chamber failure, fluid would travel from the body 2 up the stem 6 and pass through the primary packing chamber 16. The fluid would be stopped by the secondary packing chamber 26 and would exit the dual packing chamber 12 at thermal release 20. The fluid would then reach the pressure transmitter 34 and the check valve 36. The pressure transmitter would signal the operation center of a primary packing chamber failure. The check valve 36 would hold the fluid in place until a predetermined pressure is reached. Once the predetermined pressure is reached the check valve 36 will open and allow the fluid to flow from the dual packing chamber 12 back into the valve body 2, thus reducing pressure on the secondary packing chamber 28 and preventing fluid from exiting the valve through the stem 6.

The packing material used in chamber 16 and 26 may vary widely. In an embodiment, the packing material comprises an elastomer or a plurality of elastomers. In an embodiment, the elastomer may be a thermoplastic elastomer (TPE). Without limitation, examples of monomers suitable for use in forming TPEs include dienes such a butadiene, isoprene and hexadiene, and/or monoolefins such as ethylene, butenes, and 1-hexene. In an embodiment, the TPE includes polymers comprising aromatic hydrocarbon monomers and aliphatic dienes. Examples of suitable aromatic hydrocarbon monomers include without limitation styrene, alpha-methyl styrene, and vinyltoluene. In an embodiment, the TPE is a crosslinked or partially crosslinked material.

The above detailed description of the present invention is given for explanatory purposes. It will be apparent to those skilled in the art that numerous changes and modifications can be made without departing from the scope of the invention. Accordingly, the whole of the foregoing description is to be construed in an illustrative and not a limitative sense, the scope of the invention being defined solely by the appended claims.

I claim:

1. A method for repairing a valve intended to control the flow of fluid, the valve including a valve body having ports, a stem for actuating the valve, a yoke tube connected to the valve body including a first packing chamber containing packing materials that circumscribe and engage with the stem to prevent fluid leakage about the stem and a handle; including the steps of:

separating the yoke tube and first packing chamber from the valve body;

attaching a second packing chamber containing packing materials that circumscribe and engage the stem to the valve body; attaching a body having a thermal release opening to the second packing chamber and, reattaching the yoke tube having the first packing chamber to the body, thereby creating two separate and distinct packing chambers circumscribing and engaging with the stem to prevent fluid leakage about the stem;

wherein the second packing chamber creates a primary packing seal against fluid leakage and the first packing chamber creates a secondary packing seal to prevent fluid leakage, wherein upon failure of the primary packing seal the fluid is prevented by the secondary packing seal from escaping to the environment and instead escapes through the thermal release opening.

* * * * *